May 31, 1927.  
R. L. CARTER  
ROUTER BIT  
Filed Oct. 28, 1926  
1,630,830
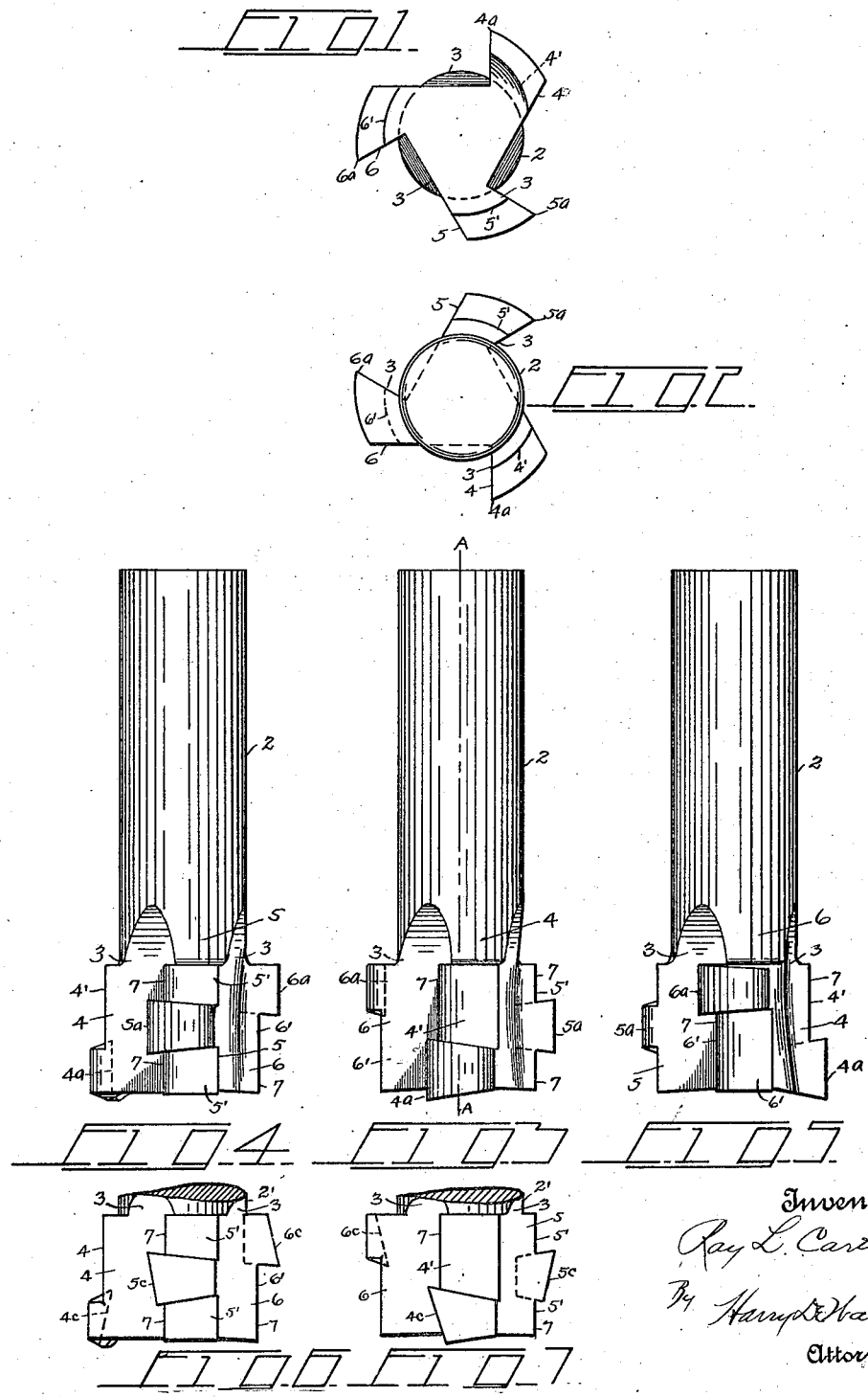
Inventor  
Ray L. Carter.  
By Harry D. Wallace.  
Attorney.

Patented May 31, 1927.

1,630,830

UNITED STATES PATENT OFFICE.

RAY L. CARTER, OF PHOENIX, NEW YORK.

ROUTER BIT.

Application filed October 28, 1926. Serial No. 144,803.

This invention relates to a new and useful improvement in routing bits, and has for its object to provide a rotary tool of the fluted type, having a plurality of longitudinal ridges and grooves, the ridges being formed with side cutting edges. The primary object is to provide a bit of the character, wherein the several cutting edges are correspondingly reduced to less than one-half their normal length as compared with the older bits of this class. A further object is to dispose these relatively narrow cutting edges in such manner that each edge travels and cuts in a different plane, the said planes being parallel, and the said cutting edges being arranged to travel in paths that overlap and perform their cutting work in the respective planes sequentially from the lowermost to the uppermost planes, thereby distributing the power by which the bit is driven, more evenly throughout the length of the bit, and eliminating chattering, vibrating and noise common to fluted router and planer bits in common use.

I attain these objects by the means set forth in the detailed description which follows, and as illustrated by the acompanying drawing, in which—

Figure 1 is a bottom end view of a bit formed with three side cutting ridges. Fig. 2 is a top end view of the same. Fig. 3 is a view, showing a front side elevation of the lowermost cutting blade. Fig. 4 is a similar view, showing a full side elevation of the medial cutting blade. Fig. 5 is a similar view, showing a full side elevation of the top cutting blade. The last three views show the sequential performance of the several blades, and the respective planes in which the said blades perform their cutting work, while passing a given point, as indicated by the broken vertical line A—A in Fig. 3. And Figs. 6 and 7 are broken elevations, showing modified cutting blades.

In the drawing, 2 represents the main body or shank of the bit, which is preferably a solid cylinder adapted to be supported and driven by any suitable chuck (not shown). The lower end portion of the shank 2 is preferably enlarged, and this portion is also fluted, as at 3, for providing a plurality of angular longitudinal ridges, 4, 5 and 6, each of said ridges in order, from the bottom to the top of the enlargement being milled or cut away at different points, as at 4', 5', and 6', for reducing said portions and providing similar projecting radial primary cutting blades or edges, $4^a$—$5^a$—$6^a$, said reduced portions having relatively sharp secondary cutting edges 7, arranged respectively in the same vertical planes as the primary blades. These secondary edges rarely perform any actual cutting, but are useful for strengthening the cutting end of the bit, as well as for ejecting the chips resulting from the cutting by the primary blades. The blades $4^a$—$5^a$—$6^a$ are preferably disposed in parallel planes horizontally according to the drawing, so that each blade cuts a path of its own when the bit is rotated. The primary blades are substantially the same length, and they taper from end to end circumferentially for enabling their sharp edges to effect free and clear cutting. The said blades are also backed off eccentric to the axis of the shank 2, for preventing choking of the bit during routing or other work. The cutting edges of the primary blades are preferably of such breadth that each blade tends to cut a path that slightly overlaps the path of the adjacent blade, thereby ensuring the complete and perfect routing of any job, in case the corners of either of the blades become dulled or broken. The primary blade $4^a$ is disposed at the extreme lower end of the rib 4, and a portion of its cutting edge preferably extends below the plane of the bottom of the shank, and is aadpted to bore or cut endwise for sinking the tool axially to the proper depth. The ridges 5 and 6 are substantially level or flush with the end of the shank. When the bit is being driven axially to a depth equal to the height of the enlargement of the shank all of the primary blades effect their proper share of the cutting, and the result is a plain round hole or socket. After the bit has bored to the desired depth, in case an oval or other shaped cavity is to be routed, the bit is usually propelled by the operator in the proper direction, and at the start of any lateral movement, the primary blade $4^a$ cuts at the bottom, at the top, and also forwardy, during the first one-third revolution of the bit. When the blade $5^a$ reaches the starting position A, it starts cutting in the next higher plane and continues to cut during the next one-third revolution. By this time the primary blade $6^a$ has advanced to the line A and starts cutting in the uppermost plane. It will be understood that the blades 4ª—5ª continue cutting in their respective planes while blade 6ª is effecting its cut, as described, and if the operator continues to propel the bit laterally the several primary blades cut continuously. It will be also understood that the blade 4ª, owing to its location, shape, and its spacing from the intermediate blade 5ª, performs the greater portion of the cutting, for the reason that said blade cuts in three directions, as explained. Owing to the fact that blade 4ª cuts into the path followed by blade 5ª, the latter only cuts forwardly and at the top, and since the top portion of blade 5ª cuts into the path of blade 6ª, the latter blade only cuts forwardly, in order to complete the routing work. The fluted end of the bit, being farthest from the chuck is naturally subject to greater vibration than the rest of the bit, and for that reason blade 4ª is arranged to perform a third more work than blade 5ª, and likewise blade 5ª performs a third more work than blade 6ª. This disposition and arrangement of the cutting members tends to steady the bit with the result that routing and other work may be done with greater rapidity and smoothness, as well as without chattering and noise.

In Figs. 6 and 7 I have shown cutting edges 4ᶜ, 5ᶜ and 6ᶜ of the blades ground off at an angle. For certain kinds of routing this angular arrangement enables the blades to cut with a sheering or slicing stroke, which tends to effect a smoother finish. These angular blades are particularly advantageous for routing burly, as well as the softer and more spongy species of wood, like red wood, white wood, poplar and the like.

Having thus described my invention, what I claim, is—

1. A routing tool formed at one end with longitudinal side cutting ribs, a portion of each rib being cut away for providing a relatively narrow cutting spur, the said spurs being arranged to cut in different planes sequentially, and the combined cutting range of the several spurs being substantially equal to the length of said ribs.

2. A routing tool comprising a longitudinally fluted body formed with a plurality of side cutting edges, a portion of each of said edges being cut away for providing a single primary cutting blade of less than one-half the normal length of said edges, the blades of the several edges being arranged to cut in parallel planes sequentially, and the paths cut by said blades partially merging.

3. A routing tool comprising a cylindrical body having a fluted enlargement at one end for providing a plurality of longitudinal equidistantly spaced ribs having similar side-cutting edges, a portion of said ribs being cut away for providing routing blades of less than one-half the normal length of said side-cutting edges, and the several blades being arranged to travel and cut in different transverse planes.

4. A routing tool comprising a shank having an enlargement at one end, said enlargement being fluted for providing longitudinal ridges having similar side-cutting surfaces, a portion of each ridge being cut away for reducing the effective cutting edge to less than one-half the length of the ridge, and the cutting edges of the several ridges being arranged in different planes and adapted to travel in parallel paths that overlap each other.

5. A routing tool comprising a cylindrical body having a fluted enlargement for providing a plurality of longitudinal ribs, said ribs having similar side-cutting edges and being cut away in part for providing routing blades of less than one-half the normal length of said side-cutting edges, the blades of each rib being arranged to travel and cut in a plane parallel to the paths of the adjacent blades, and the blade of one rib extending beyond the end of the body adapted for sinking the tool axially.

6. A tool for routing and boring comprising a round body having an enlargement at one end, said enlargement being fluted for providing equidistantly spaced longitudinal ribs, said ribs being formed with similar side-cutting edges, a portion of one rib being cut away at the top for providing a cutting blade at the free end of the rib, portions of the next rib in order being cut away at the top and at the bottom for providing a medial cutting blade, the next rib in order being cut away at its bottom to provide a cutting blade at the top of the rib, and said cutting blades adapted to cut rotary paths parallel to and overlapping each other.

7. A routing tool comprising a body having an enlargement at one end, said enlargement being fluted for providing similar angular longitudinal ribs, the corresponding edges of said ribs being sharp, portions of said ribs being cut away for providing projecting primary cutting blades that are arranged to cut in parallel planes, the blade of each rib adapted to travel in a path that overlaps the path traveled by the adjacent blade, and each rib being provided with a secondary cutting edge that ejects the chips resulting from the cutting by the primary blades.

8. A routing tool comprising a body having an enlargement at one end, the enlargement being fluted for providing angular side-cutting ridges, portions of said ridges being cut away for providing cutting edges less than one-half the length of the ridges, the cutting edge of one ridge being disposed at the bottom of the enlargement, the cutting edge of the next rib being disposed midway between the top and bottom of the enlargement, and the cutting edge of the third ridge being disposed at the top of the enlargement, said cutting edges adapted to travel and cut circular paths that lie in parallel planes, and the path of the medial cutting edge overlapping the paths of the adjacent cutting edges.

In testimony whereof I affix my signature.

RAY L. CARTER.